3,655,640
WATER SOLUBLE LITHIUM-N-BENZOYL-2-[[1-(DI-CHLOROPHENYL) - 3 - METHYL - 5 - OXO-2-PYRAZOLIN-4-YL]AZO]SULFONATES
Robert C. Hoare, Hamburg, N.Y., assignor to Allied Chemical Corporation, New York, N.Y.
No Drawing. Filed Apr. 23, 1969, Ser. No. 818,821
Int. Cl. C09b 29/38; D06p 1/06
U.S. Cl. 260—162
2 Claims

ABSTRACT OF THE DISCLOSURE

Lithium-N-benzoyl-2-[[1-(dichlorophenyl)-3 - methyl-5-oxo-2-pyrazolin-4-yl]azo]sulfanilates of excellent water solubility adapted for dyeing polyamide fibers in bright greenish yellow shades, fast to light and washing.

This invention relates to lithium-N-benzoyl-2-[[1-(dichlorophenyl)-3-methyl-5-oxo-2-pyrazolin-4 - yl]azo]sulfanilates and to polyamide fibers dyed therewith.

It is known to dye polyamide fibers, e.g. hexamethylene polyadipamide (nylon 6,6) and polyepsiloncaprolactam (nylon 6) with the sodium salt of the coupling product of diazotized 2-amino-4-benzamidobenzene sulfonic acid and a monochlorophenyl 3-methyl-5-pyrazolone such as sodium N-benzoyl-2-[[1-(o-chlorophenyl)-3-methyl-5-oxo-2-pyrazolin-4-yl]azo]sulfanilate. The resultant yellow dyeing is relatively dull and of an undesirable reddish shade. The above-mentioned prior art dye, albeit a sodium salt, is only sparingly soluble in water, its solubility in boiling water at neutral pH being less than about 0.1 percent. The poor solubility of the prior art dye prevents its use in neutral concentrated aqueous dyebaths and printing liquors, for example, in 2% aqueous alkylene glycol printing liquors which should contain at least 5 to 10 weight percent dissolved dye to provide adequately strong dyeings.

It is an object of this invention to provide novel water soluble monoazo dyes which dye polyamide fibers in bright greenish yellow shades.

It is a further object of the invention to provide such dyes having a high degree of water solubility.

These and other objects are accomplished by providing novel lithium N-benzoyl-2-[[1-(dichlorophenyl)-3-methyl-5-oxo-2-pyrazolin-4-yl]azo]sulfanilates.

The new lithium salts of my invention have the following general formula

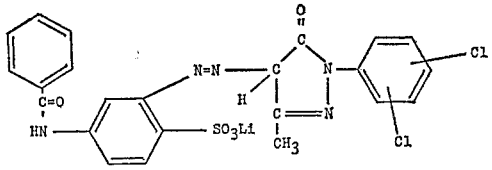

wherein the chlorine atoms can be in any desired relative positions on the phenyl radical, including the 2,5 positions, the 2,6 positions, the 2,4 positions or the 3,5 positions.

Surprisingly the novel lithium salt dyes of my invention are approximately 250 times more soluble in neutral water than the corresponding sodium salts and about 500 times more soluble in water than the aforementioned prior art monochlorosodium salt dye. Furthermore the dyestuffs of my invention dye polyamide fibers in yellow shades which are unexpectedly brighter and more greenish in shade than similar dyeings of the foregoing sodium salt dyes.

The dyes of my invention can be prepared by diazotizing aqueous 2-amino-4-benzamidobenzene sulfonic acid (advantageously charged as its sodium salt), coupling the resultant diazonium salt with a dichlorophenyl-3-methyl-5-pyrazolone under alkaline conditions, acidifying the coupling product to recover the sulfanilic acid monoazo dyestuff, neutralizing this acid with lithium alkali, such as lithium hydroxide or monohydrate thereof, and recovering the lithium salt of the dyestuff. Typical dichlorophenyl-3-methyl-5-pyrazolone coupling components and the corresponding resulting dyes prepared therefrom according to the invention include:

2,5-dichlorophenyl-3-methyl-5-pyrazolone→lithium-N-benzoyl-2-[[1-(2,5-dichlorophenyl)-3-methyl-5-oxo-2-pyrazolin-4-yl]azo]sulfanilate
2,4-dichlorophenyl-3-methyl-5-pyrazolone→lithium-N-benzoyl-2-[[1-(2,4-dichlorophenyl)-3-methyl-5-oxo-2-pyrazolin-4-yl]azo]sulfanilate
2,6-dichlorophenyl-3-methyl-5-pyrazolone→lithium-N-benzoyl-2-[[1-(2,6-dichlorophenyl)-3-methyl-5-oxo-2-pyrazolin-4-yl]azo]sulfanilate
3,5-dichlorophenyl-3-methyl-5-pyrazolone→lithium-N-benzoyl-2-[[1-(3,5-dichlorophenyl)-3-methyl-5-oxo-2-pyrazolin-4-yl]azo]sulfanilate Preferably, I employ 2,5-dichlorophenyl-3-methyl-5-pyrazolone as the coupling component because the 2,5-dichlorophenyl-3-methyl-5-pyrazolone coupling component is most readily available. The diazotization and coupling procedure using this compound are listed below

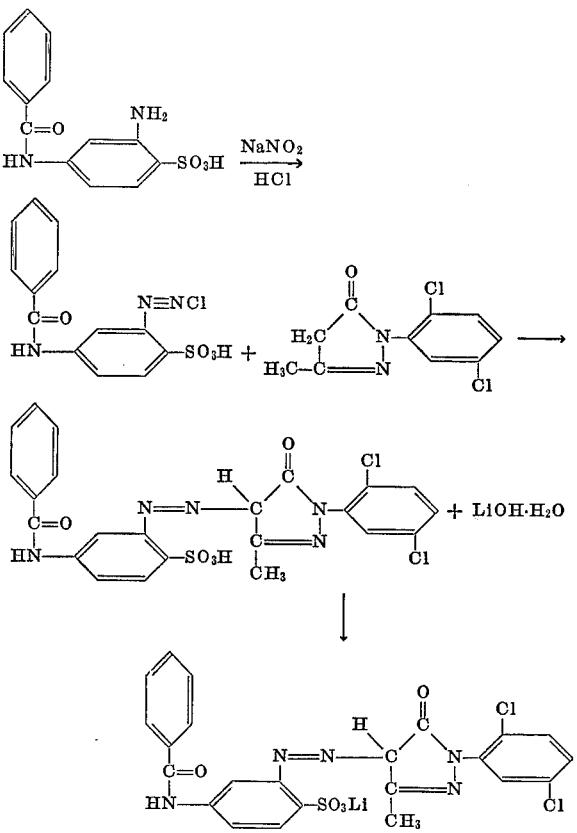

In preparation for dyeing with the lithium salt dyestuffs of my invention, the salts are ground or pulverized in the presence of antidusting agents, emulsifying agents for the latter and, if desired, blended with inert diluents such as dextrin or sucrose as is conventional in this art. Polyamide dyeing and printing with the present dyestuffs is effected in aqueous media at about neutral pH, e.g. a pH of about 6 to 8, in accordance with conventional practice.

The lithium salts of my invention dye polyamide fibers and fabrics in level attractive bright greenish yellow shades which are fast to light and washing. The present dyes have excellent solubility in water exhibiting solubilities of about 50 weight percent at ambient temperature at neutral pH. Accordingly, they can be employed in neutral aqueous polyamide dyebaths and printing liquors containing 10 weight perecnt or more of the dissolved dye. The novel dyestuffs are also excellent dyes for wool but are relatively non-substantive to cotton and other cellulosic fibers.

In the following examples, which illustrate my invention, parts, percentages and proportions are by weight, unless otherwise noted, and temperatures are in degrees centigrade.

EXAMPLE (A) Preparation of sodium N-benzoyl-2-[[1-(2,5-dichlorophenyl) - 3 - methyl-5-oxo-2-pyrazolin-4-yl]azo] sulfanilate A mixture of 447 parts (1.424 mols) of the sodium salt of 2-amino-4-benamidobenzene sulfonic acid and 5600 parts water is agitated at 80–90° to dissolve the salt. Over a period of about 30 minutes, 533 parts aqueous 20° Bé. hydrochloric acid are charged to the solution. The resultant acidic slurry is cooled to 20° and 112 parts of sodium nitrite are added over a period of 30 minutes. After the acidic mixture has been agitated for 30 minutes at 20–25° to complete diazotization of the amino sulfonic acid, 7 parts of sulfamic acid are charged to destroy excess nitrous acid. Over a period of about one hour, the resultant diazonium salt solution is charged to a mixture of 383 parts (1.575 mols) of 2,5-dichlorophenyl-3-methyl-5-pyrazolone and 5300 parts of water at 15–20° which has been made alkaline to C.I. Direct Blue 8 indicator at 50° by addition of 200 parts caustic soda (charged as a 50° Bé. aqueous solution). Sodium chloride (3200 parts) is charged to the resultant coupling mass which is then agitated at ambient temperature for two hours. The precipitated sodium salt of the coupling product is recovered by filtration. The crude product is melted under a current of circulating air at 60–70°, forming an organic layer and an aqueous layer which is decanted and discarded. The product is then dried at about 90 to 100°. There is obtained 865 parts of N-benzoyl-2-[[1-(2,5-chlorophenyl) - 3-methyl-5-oxo-2-pyrazolin-4-yl[azo]sulfanilic acid sodium salt which is micropulverized with 45 parts of "Calgon" (a sodium phosphate glass), 400 parts of dextrin and 45 parts sodium ortho silicate as an alkaline additive. The resultant composition has a solubility in boiling water of only about 0.2% at a pH of about 7 to 8. A 5 part sample of the dye, heated to the boil with 93 parts water and 2 parts diethylene glycol and thereafter cooled to about 75° produces a slurry containing the dye in the form of a spongy solid.

A 10 part sample of hexamethylene polyadipamide (nylon 6,6) skeins is dyed for one hour at 95° with the above dye composition (0.1 part coresponding to 1% dye on the weight of the fiber, employing a 400 part by volume aqueous dye-bath containing 10% sodium chloride). The resultant yellow dyeing is greener in shade and brightener than a similar dyeing obtained from the monochlorinated compound N-benzoyl-2-[[1-(o-chlorophenyl)-3-methyl-5-oxo-2-pyrazolin - 4 - yl]azo]sulfanilic acid sodium salt. The latter prior art dyestuffs has a water solubility of less than about 0.1% at a pH of about 7–8, at about 100°.

(B) Preparation of lithium salt by neutralization of free acid in the solid phase About 200 parts by volume of an aqueous alkaline coupling mixture obtained from 55 parts (0.176 mol) of the sodium salt of 2-amino-4-benzamidobenzene sulfonic acid, and 48.5 parts (0.2 mol) of 2,5-dichlorophenyl-3-methyl-5-pyrazolone substantially as described in A above, is agitated at ambient temperature for 1 hour. The mass is acidified with 13 parts by volume of aqueous 50° Bé. sulfuric acid. After the mixture is heated to 70–80° an additional 0.2 part by volume of aqueous 50° Bé. sulfuric acid is charged to bring the pH of the mixture to about 6.8. The mass is cooled to ambient temperature and filtered. The recovered N - benzoyl-2-[[1-(2,5-dichlorophenyl) - 3-methyl-5-oxo-2-pyrazolin-4-yl]azo]sulfanilic acid is washed free of sulfuric acid and sodium with water at ambient temperature and dried at 90° for 16 hours. The resultant sulfanilic acid (117.2 parts, 0.215 mol) is converted to its lithium salt by grinding with 19.5 parts (0.464 mol) of lithium hydroxide monohydrate. The resultant lithium sulfanilate dye has a solubility of about 50% in neutral water at ambient temperature. About 130 parts of this lithium salt is blended with 13 parts of the sodium phosphate glass of part A, 1 part by volume dioctylphthalate antidusting agent, 3 parts of Aerosol OTB (sodium sulfosuccinic acid dioctyl ester emulsifier) and 45 parts of sucrose. The solubility of the resultant dyestuff in 2% aqueous diethylene glycol is at least 10%. A 10 part sample of hexamethylene polyadipamide skeins is dyed for 45 minutes at 95° with the above dye composition (0.1 part), corresponding to 1% dye on the weight of the fiber, employing a 400 parts by volume aqueous dyebath containing 3% ammonium acetate, 1% of Dowfax 2A–1 (sodium dodecyl diphenyl ether disulfonate surfactant), 0.5% of Triton CF–10 (an alkyl aryl polyether surfactant) and 3% ammonium hydroxide. The resultant yellow dyeing is greener in shade and brighter than a similar dyeing employing the sodium salt dyestuff of part A. Under the foregoing dyeing conditions, the present lithium salt dyestuff dyes nylon 6 (polyepsilon caprolactam) and wool in bright greenish yellow shades.

(C) Preparation of lithium salt by neutralization of the corresponding acid in aqueous medium An agitated slurry of 2230 parts (4.1 mols) of N-benzoyl - 2 - [[1-(2,5-dichlorophenyl)-3-methyl-5-oxo-2-pyrazolin-4-yl]azo]sulfanilic acid obtained as described in part B and 5000 parts of water is heated to 80–85° and neutralized with 250 parts (5.95 mols) lithium hydroxide monohydrate. About 10 parts of dioctyl phthalate is charged to the resultant warm solution of the lithium salt dye of part B which is spray dried at 60–135°. The resultant dried lithium salt is ground with 220 parts of the sodium phosphate glass of part A, 50 parts of the emulsifier of part B and 590 parts of dextrin. The resultant water soluble dyestuff composition is substantially similar to that of part B.

Dyestuffs wherein the chlorine substituents on the phenyl radical are in the 2,4, 2,6 and 3,5 positions, respectively, can be prepared in like manner and exhibit similarly favorable solubility and dyeing characteristics.

I claim:

1. Lithium N - benzoyl - 2 - [[1-(dichlorophenyl)-3-methyl - 5 - oxo-2-pyrazolin-4-yl]azo]sulfanilate of the formula

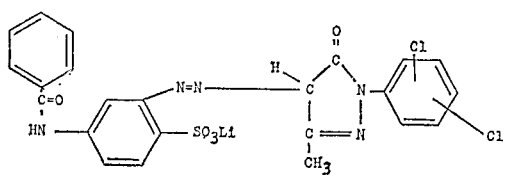

2. The compound according to claim 1 wherein the chlorine atoms are in the 2,5 positions on the phenyl radical.

References Cited

UNITED STATES PATENTS 3,123,596   3/1964   Eltonhead _____ 260—162
3,246,945   4/1966   Stanley et al. _____ 260—162 X FLOYD D. HIGEL, Primary Examiner U.S. Cl. X.R.

260—310 D, 508